US012401725B2

(12) United States Patent
Bakos et al.

(10) Patent No.: US 12,401,725 B2
(45) Date of Patent: Aug. 26, 2025

(54) COMMUNICATION SYSTEM FOR MICRO-FRONTENDS OF A WEB APPLICATION

(71) Applicant: RED HAT, Inc., Raleigh, NC (US)

(72) Inventors: Alexandre Porcelli Bakos, Westford, MA (US); Tiago Fernandes, Campinas (BR); Eder Ignatowicz, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 188 days.

(21) Appl. No.: 18/460,272

(22) Filed: Sep. 1, 2023

(65) Prior Publication Data

US 2023/0412694 A1    Dec. 21, 2023

Related U.S. Application Data

(63) Continuation of application No. 17/372,783, filed on Jul. 12, 2021, now Pat. No. 11,778,045.

(51) Int. Cl.
*H04L 67/147* (2022.01)
*H04L 67/02* (2022.01)
*H04L 67/51* (2022.01)

(52) U.S. Cl.
CPC ............ *H04L 67/147* (2013.01); *H04L 67/02* (2013.01); *H04L 67/51* (2022.05)

(58) Field of Classification Search
CPC ........ H04L 67/147; H04L 67/51; H04L 67/02
See application file for complete search history.

(56) References Cited

U.S. PATENT DOCUMENTS 6,766,333 B1  7/2004  Wu et al.
9,430,808 B2  8/2016  Fortini et al.
(Continued)

FOREIGN PATENT DOCUMENTS

CN  111209104 A  5/2020
CN  111694633 A  9/2020
(Continued)

OTHER PUBLICATIONS

U.S. Appl. No. 17/698,687, "Final Office Action", Sep. 21, 2023, 17 pages.
(Continued)

*Primary Examiner* — Jerry B Dennison
(74) *Attorney, Agent, or Firm* — Kilpatrick Townsend & Stockton LLP (57) ABSTRACT

A communication system for a micro-frontend architecture can include a first message handler associated with a requestor of data and a second message handler associated with a requestee. The requestor can be a wrapper application or a micro-frontend, and the requestee can the other of the wrapper application or the micro-frontend. In response to receiving a data request from the requestor, the first message handler can transmit a request message via a communication channel to the second message handler, where the request message includes a unique identifier assigned to the request. Thereafter, the first message handler can receive a response message from the second message handler via the communication channel, where the response message includes the data and the unique identifier. Based on the unique identifier in the response message, the first message handler can provide the data to the requestor in a response to the request.

20 Claims, 7 Drawing Sheets

(56) References Cited

U.S. PATENT DOCUMENTS

| | | | |
|---|---|---|---|
| 9,971,748 B2 | 5/2018 | Kim et al. | |
| 9,971,826 B1 | 5/2018 | Belmar | |
| 11,042,209 B2 | 6/2021 | Stoffel et al. | |
| 11,778,045 B2* | 10/2023 | Bakos | H04L 67/51 709/203 |
| 12,067,429 B2* | 8/2024 | Fernandes | G06F 9/52 |
| 2006/0013367 A1 | 1/2006 | Sawyer et al. | |
| 2007/0198907 A1 | 8/2007 | Degala et al. | |
| 2008/0177994 A1 | 7/2008 | Mayer | |
| 2011/0179040 A1 | 7/2011 | Bessonov et al. | |
| 2011/0289404 A1 | 11/2011 | Fleur et al. | |
| 2012/0278698 A1 | 11/2012 | Hu et al. | |
| 2014/0241216 A1 | 8/2014 | Cheng et al. | |
| 2015/0256504 A1 | 9/2015 | Beausoleil et al. | |
| 2018/0121217 A1* | 5/2018 | Jarabek | G06F 9/546 |
| 2018/0314308 A1 | 11/2018 | Savidis et al. | |
| 2021/0064675 A1 | 3/2021 | Chugh et al. | |
| 2021/0247882 A1 | 8/2021 | Norman et al. | |
| 2021/0279403 A1 | 9/2021 | Strimpel et al. | |
| 2021/0365290 A1 | 11/2021 | Zhang et al. | |
| 2023/0009811 A1* | 1/2023 | Bakos | H04L 67/562 |
| 2023/0066058 A1 | 3/2023 | Yadav et al. | |
| 2023/0297444 A1* | 9/2023 | Fernandes | G06F 9/544 719/329 |
| 2023/0412694 A1* | 12/2023 | Bakos | H04L 67/562 |

FOREIGN PATENT DOCUMENTS

| | | |
|---|---|---|
| CN | 112217671 A | 1/2021 |
| CN | 112363857 B | 4/2021 |
| CN | 113254050 A | 8/2021 |
| CN | 113434034 A | 9/2021 |
| CN | 113626124 A | 11/2021 |
| CN | 113783929 A | 12/2021 |
| KR | 20210157246 A | 12/2021 |

OTHER PUBLICATIONS

Nadamoto, et al., "A Comparative Web Browser (CWB) for Browsing and Comparing Web Pages", WWW '03: Proceedings of the 12th international conference on World Wide Web, May 2003, pp. 727-735.

U.S. Appl. No. 17/698,687, "Notice of Allowance", Apr. 16, 2024, 10 pages.

Rosli, et al., "Clustering Analysis for Malware Behavior Detection Using Registry Data", International Journal of Advanced Computer Science and Applications, vol. 10, https://thesai.org/Downloads/Volume10No12/Paper_13-Clustering_Analysis_for_Malware_Behavior_Detection.pdf, 2019, pp. 1-10.

U.S. Appl. No. 17/698,687, "Advisory Action", Nov. 30, 2023, 3 pages.

U.S. Appl. No. 17/698,687, "Non-Final Office Action", Jan. 5, 2024, 19 pages.

Tasaka, et al., "A Web Synchronization Method for Supporting Real and Non-real-time Web Communication", Institute of Electrical and Electronics Engineers, 2013.

"6 Steps to your Angular-Based Microfrontend Shell", ANGULAR Architects, Available Online at: https://www.angulararchitects.io/en/aktuelles/6-steps-to-your-angular-based-microfrontend-shell/, Nov. 22, 2019, pp. 1-15.

"Gracefully Scaling Web Applications with Micro-Frontends: Part II", Collective Health, Available Online at: https://eng.collectivehealth.com/gracefully-scaling-web-applications-with-micro-frontends-part-ii-8fa730d05b14, Jan. 13, 2020, pp. 1-7.

"These are Chat Archives for Angular/Angular", Gitter, Available Online at: https://gitter.im/angular/angular/archives/2018/01/12?at=5a58ae79ae53c15903dc3168, Jan. 12, 2018, 1 page.

"Using Channel Messaging", Web APIs, MON Web Docs, Available Online at: https://developer.mozilla.org/en-US/docs/Web/API/Channel_Messaging_API/Using_channel_messaging, Accessed from Internet on Jul. 15, 2021, pp. 1-14.

U.S. Appl. No. 17/372,783, "Non-Final Office Action", Sep. 22, 2022, 16 pages.

U.S. Appl. No. 17/372,783, "Notice of Allowance", Jun. 5, 2023, 10 pages.

U.S. Appl. No. 17/372,783, "U.S. Patent Application No.", Jul. 12, 2021, 72 pages.

U.S. Appl. No. 17/698,687, "Non-Final Office Action", Apr. 12, 2023, 13 pages.

Mehta, et al., "WattsApp: Power-Aware Container Scheduling", Association for Computing Machinery, Available Online at: https://arxiv.org/pdf/2006.00342.pdf, May 30, 2020, pp. 1-13.

Mezzalira, "Building Micro-Frontends, Chapter 4. Discovering Micro-Frontend Architectures", O'Reilly Media, Inc., Nov. 17, 2021, 50 pages.

Miao, et al., "Supporting Concurrent Design by Integrating Information Sharing and Activity Synchronization", GMD—German National Research Center for Information Technology, Jan. 1999, 10 pages.

Peltonen, et al., "Motivations, Benefits, and Issues for Adopting Micro-Frontends: A Multivocal Literature Review", Information and Software Technology, vol. 136, Aug. 2021, pp. 1-18.

\* cited by examiner

COMMUNICATION SYSTEM FOR MICRO-FRONTENDS OF A WEB APPLICATION

TECHNICAL FIELD

The present disclosure relates generally to micro-frontend architectures for web applications. More specifically, but not by way of limitation, this disclosure relates to a communication system for enabling a wrapper application to communicate with micro-frontends of a web application.

BACKGROUND

Microservices have become increasingly popular given their ability to avoid the limitations of large, monolithic backends. Similar principles are now being applied to the frontend with the advent of micro-frontend architectures. Micro-frontend architectures decompose complex frontend monoliths into smaller components called micro-frontends, which can be developed, tested, and deployed independently of one another. Micro-frontends can scale better, can be upgraded faster, and can be developed more autonomously than monolithic frontends.

A micro-frontend architecture can include a wrapper application and one or more micro-frontends for display in a website browser. The wrapper application can serve as a container or shell around the micro-frontends. Each micro-frontend can serve as a frontend interface for a corresponding backend application that provides one or more backend services supporting the overall web application. Within the website browser, the wrapper application can serve as a centralized coordinator for organizing and interfacing with the micro-frontends. For example, the wrapper application can identify and interact with micro-frontends based on user interactions with the website browser, organize the micro-frontends to provide a certain visual appearance, and configure the micro-frontends to provide certain functionality.

DETAILED DESCRIPTION

Micro-frontend architectures are becoming increasingly prevalent in the development of websites and other web applications. In a common scenario, a client device can transmit a webpage request to a webserver via a website browser. The webserver can respond to the webpage request by providing program code for a wrapper application and for one or more micro-frontends to the client device for rendering in a browser window. The program code may include HTML, CSS, JavaScript, or any combination of these. Once rendered, the wrapper application and the micro-frontends may communicate with one another to implement one or more frontend functions of the web application.

To effectuate these communications, a developer may design the wrapper application to implement a specific communication technique. The developer may select the specific communicate technique depending on the browser context in which the corresponding micro-frontends will be rendered, because it may be desirable to use different communication techniques for different types of browser contexts. For example, the developer may select a first communication technique if the wrapper application is intended to communicate with a micro-frontend that is rendered in an iFrame. Alternatively, the developer may select a second communication technique if the wrapper application is intended to communicate with a micro-frontend that is rendered in a <div>. This is because a <div> can have a different browser context than an iFrame that may require a different method of communication. In some such scenarios, the wrapper application may only be compatible with a single type of browser context and may therefore be unable to communicate with micro-frontends in other browser contexts.

The above communication limitations can lead to a variety of compatibility problems and operability issues in a web application. For example, a wrapper application that is designed for use in one browser context may be incompatible with a micro-frontend designed for use in another browser context, and vice versa. As a result, these components may be unable to communicate with one another, which can result in a malfunction of the web application. As another example, the same program code may need to be duplicated multiple times to create multiple versions of a wrapper application that are compatible with different micro-frontends, or vice versa. This duplication can waste valuable computing resource. For example, storage space may be wasted in storing the duplicate program code, and processor power may be wasted in executing (e.g., concurrently) the multiple versions of the wrapper application.

Some examples of the present disclosure can overcome one or more of the abovementioned problems by providing a communication system that can enable one or more wrapper applications and one or more micro-frontends to easily communicate with one another, for example regardless of their browser contexts. In particular, the communication system can include a wrapper message handler for use by the wrapper application. The communication system can also include a micro-frontend (MFE) massage handler for use by a micro-frontend. If the wrapper application wants data from the micro-frontend, the wrapper application can transmit a request for the data to the wrapper message handler. Based on the request, the wrapper message handler can generate a request message and transmit the request message over a communication channel between the wrapper message handler and the MFE message handler. An example of the communication channel may be a messaging bus, which may be internal to or external to the browser window. The MFE message handler can receive the request message, obtain the requested data from the micro-frontend, and return the data to the wrapper message handler by transmitting a response message over the communication channel. The wrapper message handler can then receive the response message and provide the data to the wrapper application. In this way, the wrapper application can obtain data from the micro-front end. The same process can also be performed in reverse if the micro-frontend wants data from the wrapper application.

In the above example, the message handlers can engage in the communications on behalf of the wrapper application and micro-frontend. As a result, the wrapper application and micro-frontend may not need to be specifically configured for communicating in any particular way or for any particular browser context. Rather, the specific communication-logic that is typically included in wrapper applications and micro-frontends can be replaced with more generic and uniform logic for interfacing with the message handlers, for example using a relatively simple request/response schema. This can simplify the development of wrapper applications and micro-frontends, reduce compatibility problems, and reduce code duplication. And because the message handlers can transmit messages to one another over a shared communication channel that may not have the same limits imposed thereon as browser contexts (e.g., which often have strict limits imposed thereon by the website browser), the message handlers may be able to freely communicate with one another according to a predefined messaging scheme. This may enable a wrapper application to communicate with micro-frontends in different browser contexts.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
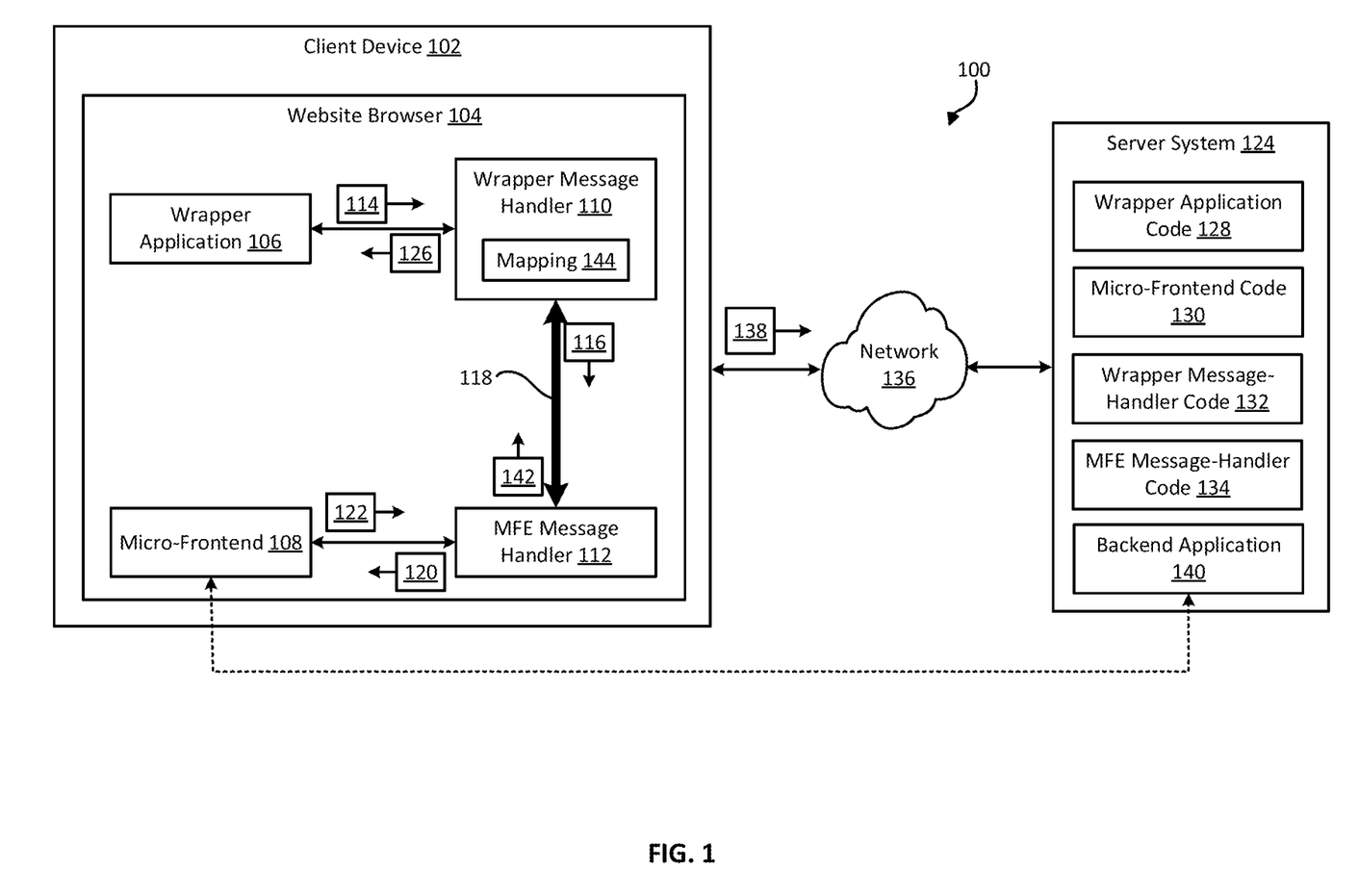
FIG. 1 shows a block diagram of an example of a system for implementing some aspects of the present disclosure.

FIG. 1 shows a block diagram of an example of a system 100 for implementing some aspects of the present disclosure. The system 100 can include a client device 102, such as a laptop computer, a desktop computer, a mobile phone, or a tablet. The system 100 can also include a server system 124, which in some examples may be a cloud-computing platform with scalable resources. The server system 124 can communicate with the client device 102 via a network 136, such as a local area network or the Internet.

The client device 102 can execute a website browser 104 to run a web application provided by the server system 124. Although the web application may include both client-side and server-side components, the website browser 104 may be considered to be running the web application if the website browser 104 is executing one or more client-side components of the web application. The web application can include a wrapper application 106 and one or more micro-front ends, such as micro-frontend 108. Each micro-frontend can correspond to a backend application on the server system 124. For example, the micro-frontend 108 can correspond to backend application 140, as represented by the dashed arrow. The backend application 140 can provide services to support the micro-frontend 108.

The server system 124 can provide the web application to the client device 102 upon request. For example, the client device 102 can transmit a website request 138 (e.g., an HTTP request) via the website browser 104 to access a particular web application of the server system 124. The server system 124 may include a webserver configured to handle such requests. The server system 124 can receive the website request 138 and responsively provide program code for the web application to the website browser 104. The program code can be in any suitable programming language, such as HTML, CSS, JavaScript, etc. The program code can be for running client-side components of the web application.

In this example, the program code can include wrapper application code 128 and micro-frontend code 130. The wrapper application code 128 can be executable by the website browser 104 of the client device 102 to run a wrapper application 106. The micro-frontend code 130 can be executable by the website browser 104 to run a micro-frontend 108. When running in the browser window, the micro-frontend 108 may be a child of the wrapper application 106 in a document object model (DOM) hierarchy.

The wrapper application 106 can display a frontend for the web application in a display area of the website browser 104. The frontend can be formed from one or more micro-frontends, such as micro-frontend 108, arranged in the display area of the website browser 104. Within the website browser 104, the wrapper application 106 may be in a browser context that is distinct from one or more browser contexts of the micro-frontends. In some cases, the wrapper application 106 can be a single page application that is dynamically updated (e.g., without fully reloading the page). For example, after providing an initial web page document to the website browser 104 in response to a page load request received from the website browser 104, the wrapper application 106 may be dynamically updated without requiring the website browser 104 to load an entirely new page. This may be achieved using asynchronous JavaScript and XML (AJAX) calls or other techniques. In the single page architecture, the wrapper application 106 can dynamically replace the micro-frontend that is currently displayed in website browser 104 with another micro-frontend, for example in response to a user interaction with the website browser 104.

In some examples, the program code provided by the server system 124 can also include wrapper message-handler code 132 and micro-frontend (MFE) message-handler code 134. The wrapper message-handler code 132 can be executable by the website browser 104 to run a wrapper message handler 110. The MFE message-handler code can be executable by the website browser 104 to run a MFE message handler 112. The wrapper message handler 110 and the MFE message handler 112 can collectively form a communication system for enabling the wrapper application 106 to communicate with the micro-frontend 108. The wrapper application 106 and the micro-frontend 108 can rely on (e.g., invoke) the wrapper message handler 110 and the MFE message handler 112, respectively, to engage in such communications.

For example, the wrapper application 106 can transmit a request 114 to the wrapper message handler 110. The request 114 can be for data from the micro-frontend 108. The request 114 can be in any suitable format. For instance, the request 114 can be an Ajax request or a function call. Based on the request 114, the wrapper message handler 110 can generate a unique identifier for the request 114. The unique identifier can uniquely identify the request 114 from other requests transmitted by the wrapper application 106. The wrapper message handler 110 can then generate a request message 116 for the data, where the request message 116 includes the unique identifier. Having generated the request message 116, the wrapper message handler 110 can transmit the request message 116 to the MFE message handler 112 via a communication channel 118. Because the request message 116 can be formatted to be compatible with the communication channel 118, the request message 116 may be in a different format from the request 114. For example, the communication channel 118 can be a messaging bus and the request message 116 can be formatted according to a predefined message schema for the messaging bus.

The MFE message handler 112 can receive the request message 116, extract the unique identifier from the request message 116, and interface with the micro-frontend 108 to obtain the requested data. For example, the MFE message handler 112 can transmit a request 120 for the data to the micro-frontend 108. The request 120 may be in a format that is different from the request message 116. For example, the request 120 can be an Ajax request or a function call. The micro-frontend 108 can receive the request 120, obtain the data, and transmit a response 122 with the requested data to the MFE message handler 112. In some examples, the micro-frontend 108 can obtain the data by generating the data or by retrieving the data from a source. Based on the response 122, the MFE message handler 112 can generate a response message 142 that includes the requested data and the unique identifier assigned to the request 114. The MFE message handler 112 can then transmit the response message 142 over the communication channel 118 to the wrapper message handler 110. Because the response message 142 can be formatted to be compatible with the communication channel 118, the response message 142 may be in a different format from the response 122.

The wrapper message handler 110 can receive the response message 142 and extract the unique identifier therefrom. The wrapper message handler 110 can then determine that the data in the response message corresponds to the request 114 based on the unique identifier. For example, the wrapper message handler 110 can maintain a mapping 144 that associates requests with unique identifiers. Each time the wrapper message handler 110 assigns a unique identifier to a new request, the wrapper message handler 110 can update the mapping 144 to include a new entry indicating an association between the unique identifier and the new request. Using the mapping 144, the wrapper message handler 110 can determine that the request 114 corresponds to the unique identifier extracted from the response message 142. The wrapper message handler 110 can then provide the data to the wrapper application 106 as a response 126 to the request 114. In this way, the mapping 144 can help ensure that the correct data is returned for each request. Having resolved the request 114, the wrapper message handler 110 may update the mapping 144 to remove the corresponding information or to otherwise reflect that the request 114 has been resolved.

While the above process illustrates an example in which the wrapper application 106 requests data from the micro-frontend 108, a similar process may also be performed in reverse if the micro-frontend 108 requests data from the wrapper application 106. In this way, bidirectional communication can be achieved between the wrapper application 106 and the micro-frontend 108.

Although FIG. 1 shows a certain number and arrangement of components, this is intended to be illustrative and non-limiting. Other examples may include more components, fewer components, different components, or a different arrangement of the components shown in FIG. 1. For instance, in other examples the wrapper message-handler code 132 can be incorporated into the wrapper application code 128 (e.g., upon transmission to the client device 102), so that the wrapper message handler 110 runs as a subpart of the wrapper application 106 in the website browser 104. Additionally or alternatively, the MFE message-handler code 134 can be incorporated into the micro-frontend code 130 (e.g., upon transmission to the client device 102), so that the MFE message handler 112 runs as a subpart of the micro-frontend 108 in the website browser 104.

Figure 2:
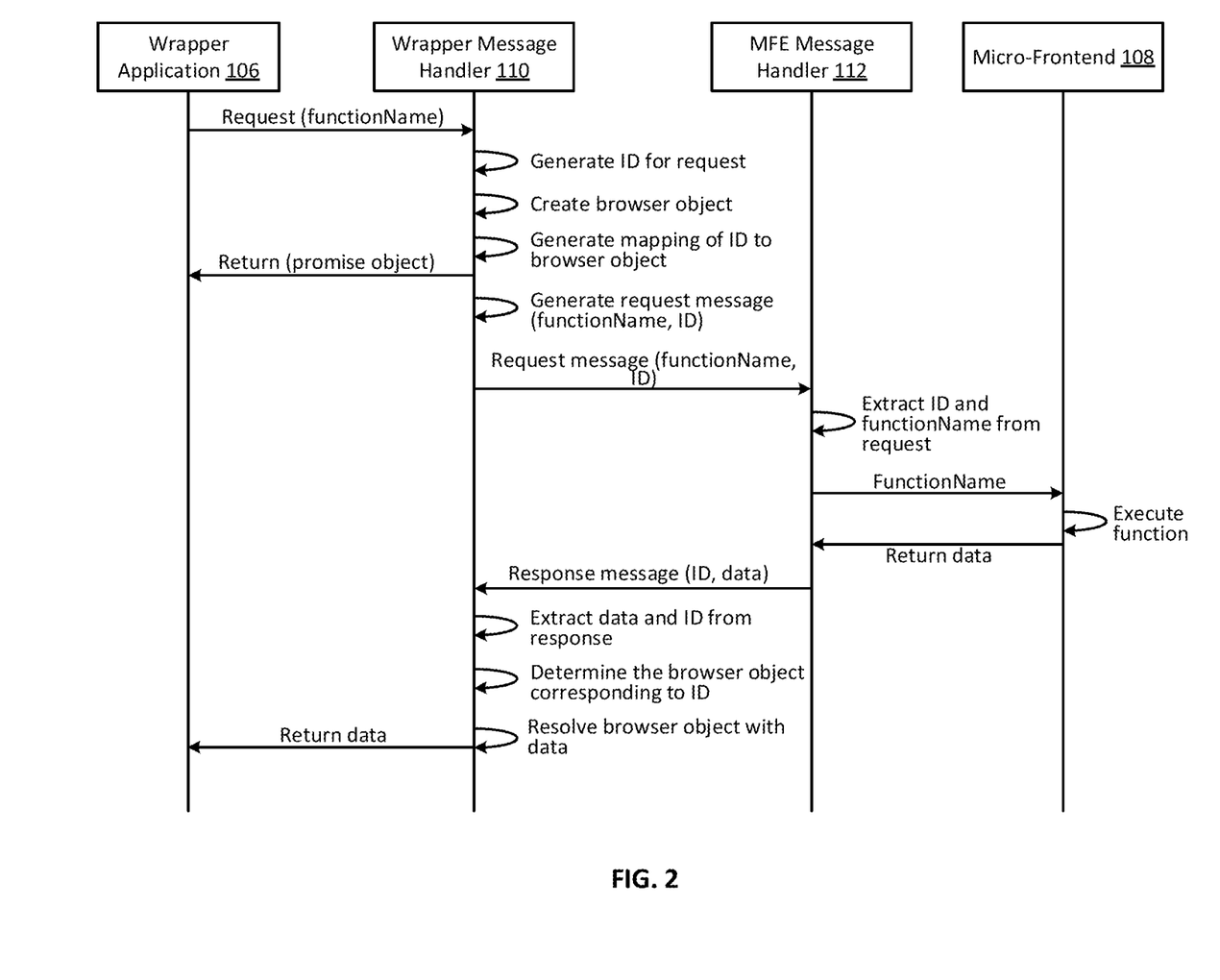
FIG. 2 shows a sequence diagram of an example of a process involving a wrapper application requesting data from a micro-frontend according to some aspects of the present disclosure.

FIG. 2 shows a sequence diagram of an example of a process involving a wrapper application 106 requesting data from a micro-frontend 108 according to some aspects of the present disclosure. The process begins with the wrapper application 106 transmitting a request indicating a function name. The request can be, for example, the request 114 of FIG. 1. The function name can be the name of a programmatic function that is to be executed by the micro-frontend 108 to obtain the target data. For example, the function may be getSomeData( ) and the request can indicate the function name "getSomeData". Arguments for the function may also be supplied in the request along with the function name. This may allow the function to be executed by the micro-frontend 108 in accordance with configurable arguments.

The wrapper message handler 110 can receive the request and generate a unique identifier for the request. The wrapper message handler 110 can also create a browser object (e.g., a DOM object) corresponding to the request. One example of such a browser object can be a promise object. A promise object is a JavaScript object that can represent the eventual failure or completion of an asynchronous operation and its resulting value. A promise object can have three states. The first state is pending, which is an initial state for the promise object. The second state is fulfilled, meaning that the asynchronous operation was completed successfully. The third state is rejected, meaning that the asynchronous operation failed. A pending promise can either be fulfilled with a value or rejected with a reason.

After generating the browser object, the wrapper message handler 110 can generate a mapping that associates the unique identifier with the browser object. For example, the wrapper message handler 110 can create an entry in the mapping that correlates the unique identifier for the request with another unique identifier of the browser object.

Next, the wrapper message handler 110 can generate a request message. The request message can be, for example, the request message 116 of FIG. 1. The request message can include the function name and the unique identifier of the request. The wrapper message handler 110 can then transmit the request message via a communication channel to the MFE message handler 112.

The MFE message handler 112 can receive the request message, extract the unique identifier and the function name from the request message, and provide the function name to the micro-frontend 108. The micro-frontend 108 can receive the function name and execute the corresponding function to obtain the data. The micro-frontend 108 can then return the data back to the MFE message handler 112. Having received the data, the MFE message handler 112 can transmit a response message that includes the unique identifier and the data to the wrapper message handler 110. The response message can be, for example, the response message 142 of FIG. 1.

The wrapper message handler 110 can receive the response message, extract the data and the unique identifier from the response message, and determine which browser object corresponds to the unique identifier by using the mapping. The wrapper message handler 110 can then return the data to the wrapper application 106, for example by resolving the browser object with the data. For example, if the browser object is a promise object, the wrapper message handler 110 can resolve the promise object such that it has a fulfilled state with a value that includes the data.

Figure 3:
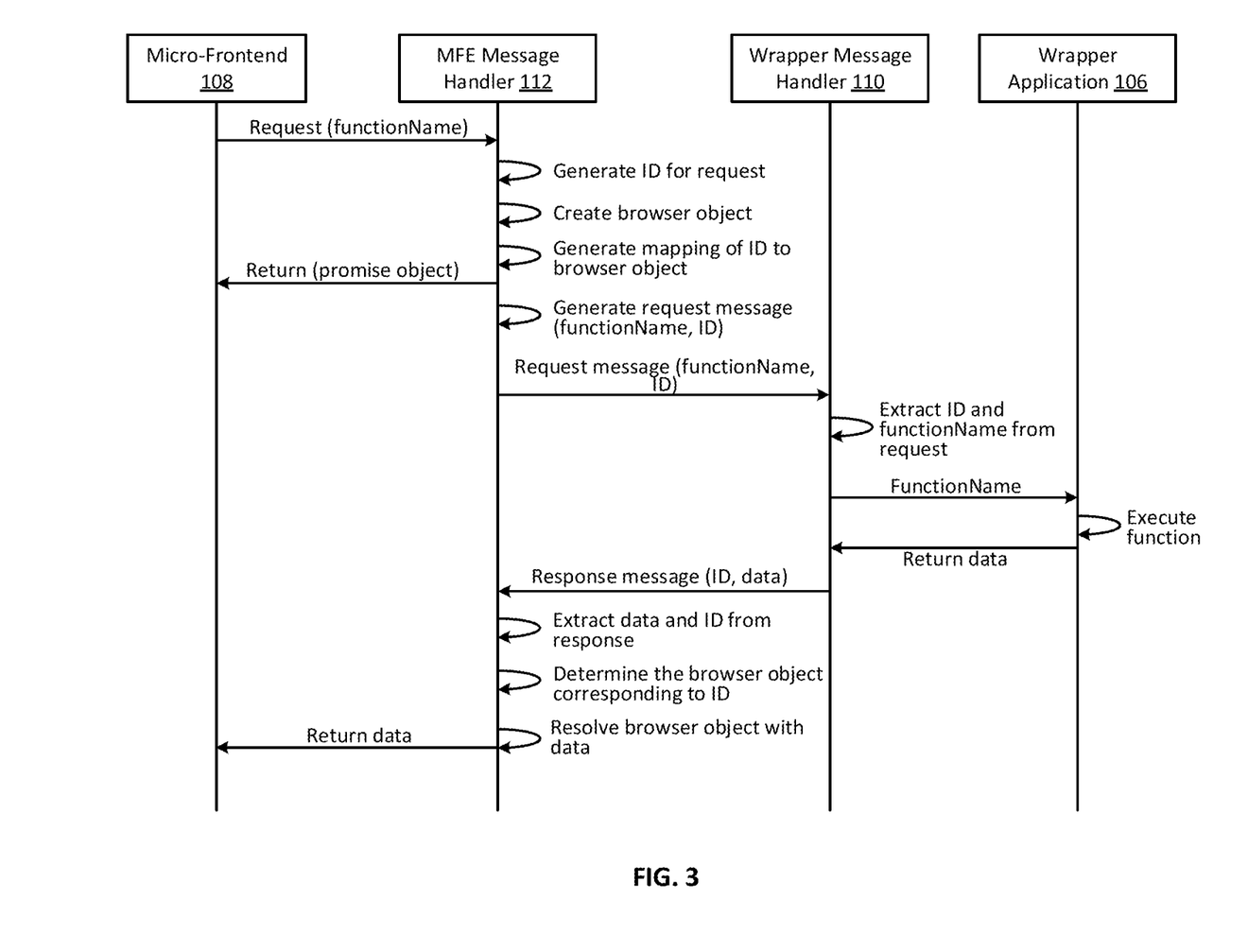
FIG. 3 shows a sequence diagram of an example of a process involving a micro-frontend requesting data from a wrapper application according to some aspects of the present disclosure.

It will be appreciated that the above steps are intended to be illustrative and non-limiting. Other examples may include more steps, fewer steps, different steps, or a different order of the steps described above. For instance, the above process can be inverted if the micro-frontend 108 wants data from the wrapper application 106. One example of this is shown in FIG. 3. As shown, the micro-frontend 108 and the MFE message handler 112 can operate similarly to how the wrapper application 106 and the wrapper message handler 110 respectively function in FIG. 2. And the wrapper application 106 and the wrapper message handler 110 can operate similarly to how the micro-frontend 108 and the MFE message handler 112 respectively function in FIG. 2.

Figure 4:
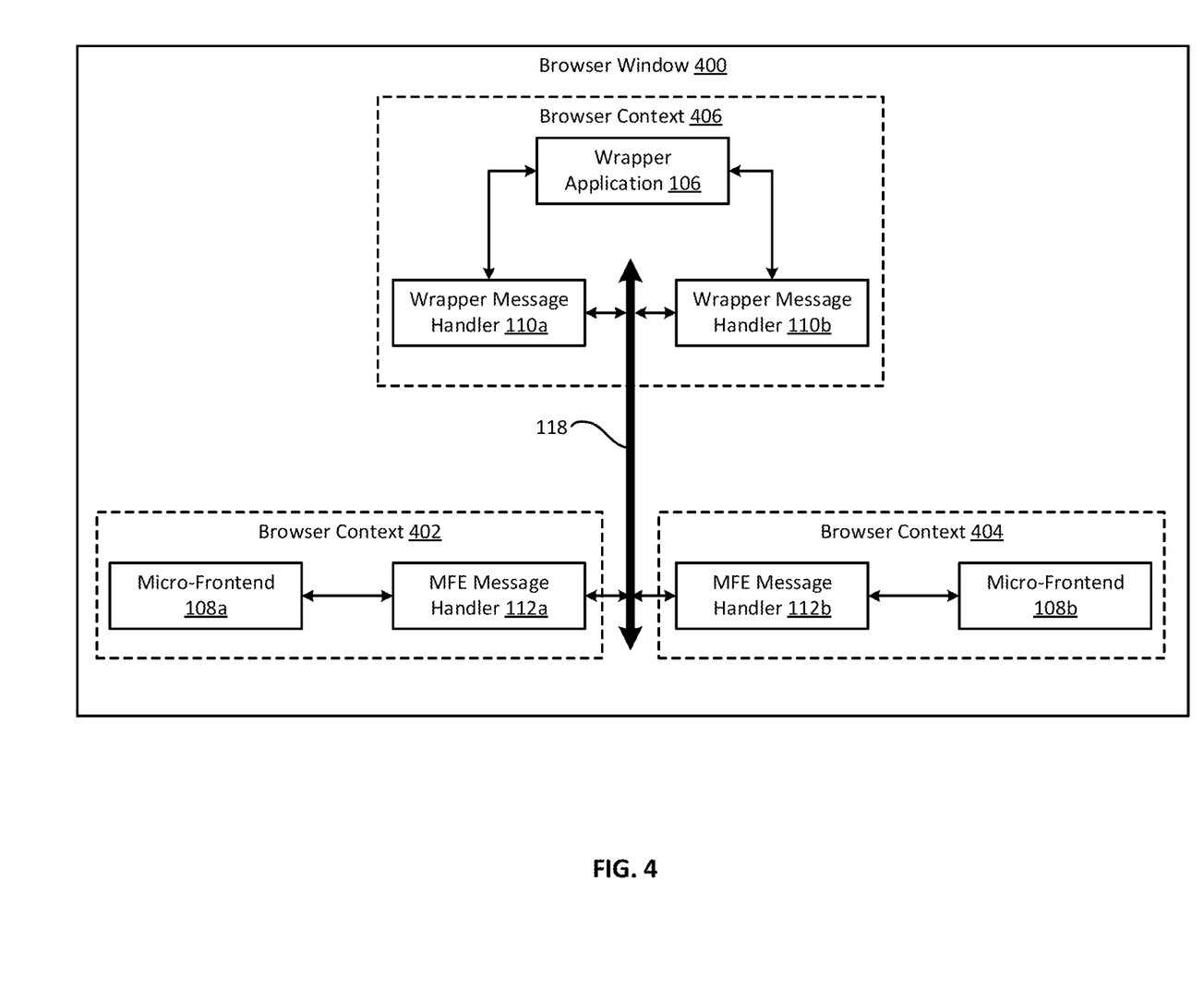
FIG. 4 shows a block diagram of an example of a browser window in which a single wrapper application can communicate with multiple micro-frontends according to some aspects of the present disclosure.

FIG. 4 shows a block diagram of an example of a browser window 400 in which a single wrapper application 106 can communicate with multiple micro-frontends 108a-b according to some aspects of the present disclosure. In this example, the micro-frontends 108a-b are in different browser contexts. Micro-frontend 108a is in browser context 402 and micro-frontend 108b is in browser context 404. Browser context 402 may be of a different type than browser context 404. For example, browser context 402 may correspond to an iFrame and browser context 404 may correspond to a <div>.

Each micro-frontend 108a-b can have its own corresponding MFE message handler 112a-b for communicating with the wrapper application 106 via the communication channel 118. The MFE message handlers 112a-b can be in the same contexts as their corresponding micro-frontends 108a-b. For example, the micro-frontend 108a and MFE message handler 112a can both be in browser context 402, while the micro-frontend 108b and MFE message handler 112b can both be in browser context 404.

The wrapper application 106 is also in a browser context 406, which may be the same as or different from one or both of the browser contexts 402-404. For example, the browser context 406 can be different from browser context 402 and browser context 404. The browser context 406 can also contain wrapper message handlers 110a-b for enabling the wrapper application 106 to communicate via the communication channel 118 with the micro-frontends 108a-b. Each of the wrapper message handlers 110a-b can be configured to communicate with one of the MFE message handlers 112a-b. Thus, the system may include as many wrapper message handlers 110 as there are MFE message handlers 112. In some examples, the wrapper application 106 can determine the number of micro-frontends 108a-b running in the browser window 400 and deploy an equivalent number of wrapper message handlers 110.

As noted above, each wrapper message handler 110 may be configured to communicate with a single MFE message handler 112. But because some or all of the wrapper message handlers 110a-b and MFE message handlers 112b may share a common (the same) communication channel 118, it may be challenging for a particular message handler to distinguish which messages on the communication channel 118 are intended for it as opposed to other message handlers. To resolve this issue, in some examples message handler identifiers may be incorporated into messages transmitted along the communication channel 118.

For example, the wrapper application 106 may transmit a request for data to the wrapper message handler 110a. Based on the request, the wrapper message handler 110a may transmit a request message to the MFE message handler 112a. The request message can include a unique identifier associated with the request. The MFE message handler 112a can receive the request message and responsively obtain the requested data from the micro-frontend 108a. The MFE message handler 112a can then generate a response message that includes the data and the unique identifier associated with the request. Additionally, the MFE message handler 112a can incorporate a message handler identifier into the response message. The message handler identifier can uniquely identify the wrapper message handler 110a that sent the request message. The MFE message handler 112a can then transmit the response message via the communication channel 118.

Next, the wrapper message handlers 110a-b can each detect the response message on the communication channel 118. Upon detecting the response message, each of the wrapper message handlers 110a-b can extract the message handler identifier from the response message and determine whether the extracted message-handler identifier matches its assigned message-handler identifier. A match between the two may mean that the response message is intended for that message handler. If there is a match, the wrapper message handler can process the response message. Otherwise, the wrapper message handler can ignore the response message. In this example, the response message has a message handler identifier corresponding to the wrapper message handler 110a, so the wrapper message handler 110a can process the response message. This can involve performing one or more of the operations described above (e.g., extracting the data from the response message and providing the data to the wrapper application 106 as a response to the request). On the other hand, the message handler identifier does not correspond to the wrapper message handler 110b, so the wrapper message handler 110b can ignore the response message.

A similar process can occur with the wrapper message handler 110b and the MFE message handler 112b. For example, the wrapper application 106 may transmit a request for data to the wrapper message handler 110b. Based on the request, the wrapper message handler 110b may transmit a request message to the MFE message handler 112b. The request message can include a unique identifier associated with the request. The MFE message handler 112b can receive the request message and responsively obtain the requested data from the micro-frontend 108b. The MFE message handler 112b can then generate a response message that includes the data and the unique identifier associated with the request. Additionally, the MFE message handler 112b can incorporate a message handler identifier into the response message. The message handler identifier can uniquely identify the wrapper message handler 110b that sent the request message. The MFE message handler 112b can then transmit the response message via the communication channel 118.

Next, the wrapper message handlers 110a-b can each detect the response message on the communication channel 118. Upon detecting the response message, each of the wrapper message handlers 110a-b can extract the message handler identifier from the response message and determine whether the extracted message-handler identifier matches its assigned message-handler identifier. Because the response message has a message handler identifier corresponding to the wrapper message handler 110b, the wrapper message handler 110b can process the response message. And because the message handler identifier does not correspond to the wrapper message handler 110a, the wrapper message handler 110a can ignore the response message.

Although FIG. 4 shows a certain number and arrangement of components, this is intended to be illustrative and non-limiting. Other examples may include more components, fewer components, different components, or a different arrangement of the components shown in FIG. 4. It will be appreciated that a browser window 400 may contain any number of wrapper applications, wrapper message handlers, micro-front ends, and MFE message handlers.

Figure 5:
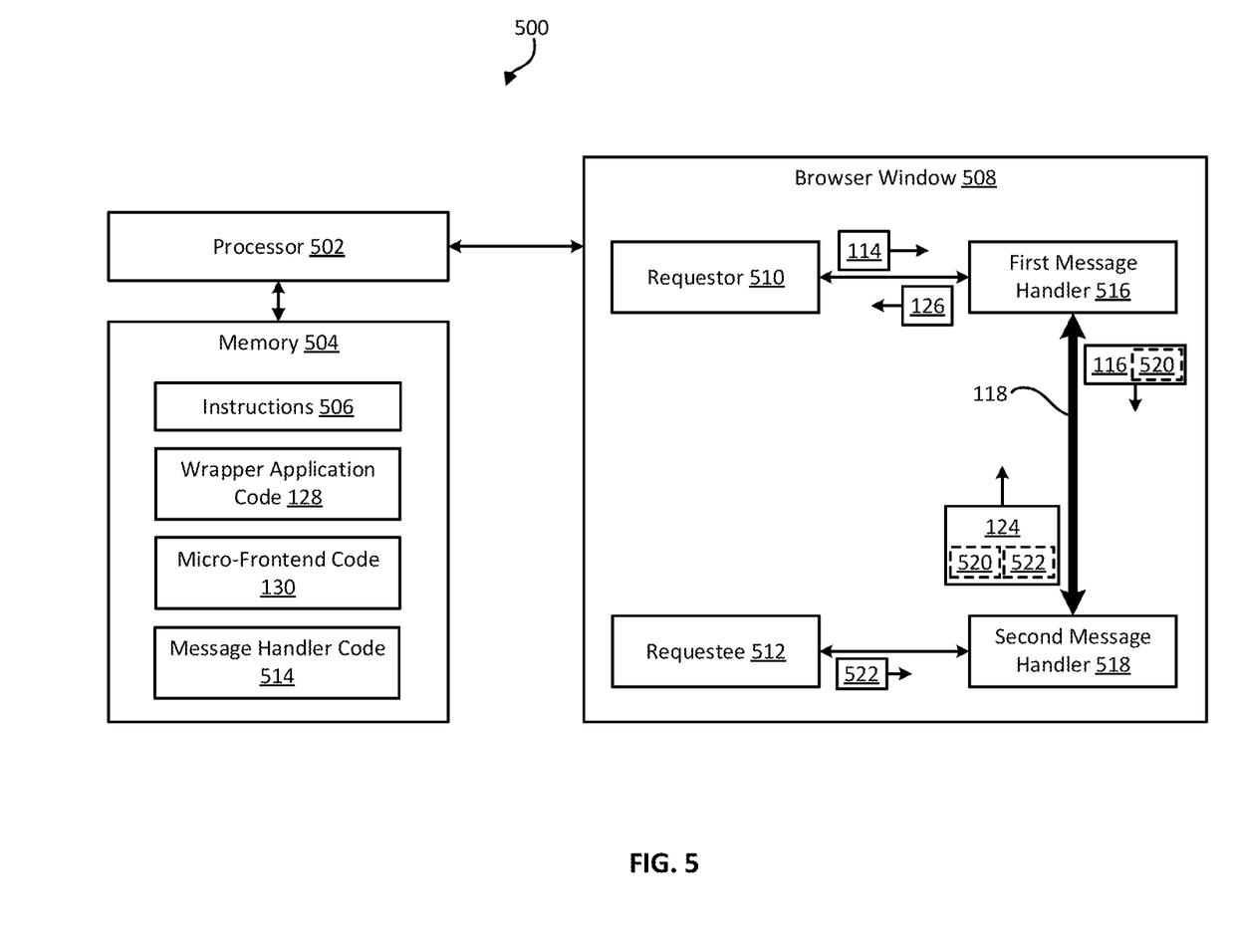
FIG. 5 shows another example of system for implementing some aspects of the present disclosure.

FIG. 5 shows another example of system 500 for implementing some aspects of the present disclosure. The system 500 includes a processor 502 that is communicatively coupled to a memory 504. In some examples, the processor 502 and the memory 504 can be part of the same computing device. For example, the processor 502 and the memory 504 can be parts of the client device 102 of FIG. 1. In other examples, the processor 502 and the memory 504 can be distributed from (e.g., remote to) one another.

The processor 502 can include one processor or multiple processors. Non-limiting examples of the processor 502 include a Field-Programmable Gate Array (FPGA), an application-specific integrated circuit (ASIC), or a microprocessor. The processor 502 can execute instructions 506 stored in the memory 504 to perform operations. The instructions 506 may include processor-specific instructions generated by a compiler or an interpreter from code written in any suitable computer-programming language, such as HTML, JavaScript, Java, CSS, Python, C, C++, or C #.

The memory 504 can include one memory or multiple memories. The memory 504 can be volatile or non-volatile. Non-volatile memory includes any type of memory that retains stored information when powered off. Examples of the memory 504 include electrically erasable and programmable read-only memory (EEPROM) or flash memory. At least some of the memory 504 includes a non-transitory computer-readable medium from which the processor 502 can read instructions 506. A computer-readable medium can include electronic, optical, magnetic, or other storage devices capable of providing the processor 502 with computer-readable instructions or other program code. Examples of a non-transitory computer-readable medium can include a magnetic disk, a memory chip, ROM, random-access memory (RAM), an ASIC, a configured processor, and optical storage.

In some examples, the memory 504 can include wrapper application code 128 and micro-frontend code 130. The wrapper application code 128 can be for a wrapper application that is executable in a browser window 508. The micro-frontend code 130 can be for a micro-frontend that is executable in the browser window 508, for example such that the micro-frontend is a child of the wrapper application in a document object model (DOM) hierarchy. The memory 504 can also include message handler code 514. The message handler code 514 can be for a first message handler 516 that is executable in the browser window 508. The message handler code 514 and the first message handler 516 may correspond to the wrapper message-handler code 132 and the wrapper message handler of FIG. 1, respectively.

In some examples, the first message handler 516 can receive a request 114 for data 522 from a requestor 510 to a requestee 512. The requestor 510 can be the wrapper application or the micro-frontend. The requestee 512 can be the other of the wrapper application or the micro-frontend. The first message handler 516 can generate a request message 116 based on the request 114, where the request message 116 includes a unique identifier 520 assigned to the request 114. The first message handler 516 can then transmit the request message 116 via a communication channel 118 to a second message handler 518 associated with the requestee 512.

At a later point in time, the first message handler 516 can receive a response message 142 from the second message handler 519 via the communication channel 118. The response message 142 can include the data 522 and the unique identifier 520. Based on the unique identifier 520 in the response message 142, the first message handler 516 can provide the data 522 to the requestor 510 in a response 126 to the request 114.

Figure 6:
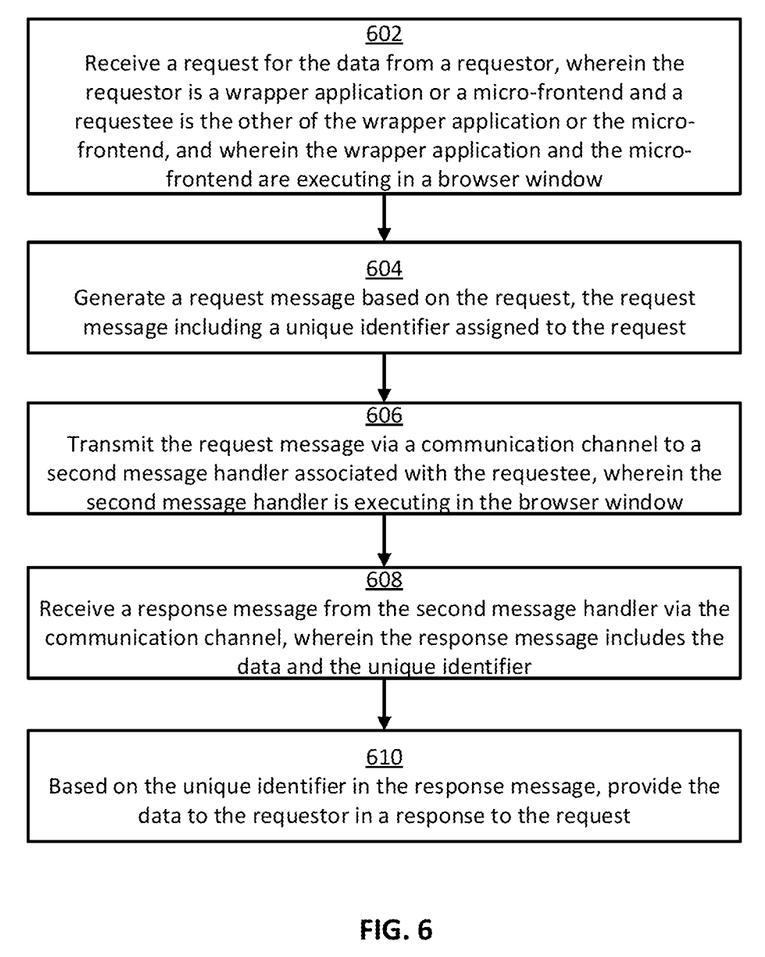
FIG. 6 shows a flow chart of an example of a process implemented by a first message handler according to some aspects of the present disclosure.

FIG. 6 shows a flow chart of an example of a process implemented by a first message handler according to some aspects of the present disclosure. But other examples can include more steps, fewer steps, different steps, or a different order of the steps than is shown in FIG. 6. The steps of FIG. 6 are discussed below with reference to the components discussed above in relation to FIGS. 1 and 5.

In block 602, the first message handler 516 can receive a request 114 for data 522. The request 114 can be transmitted from a requestor 510 and be for obtaining data 522 from a requestee 512. The requestor 510 can be a wrapper application or a micro-frontend. The requestee 512 can be the other of the wrapper application or the micro-frontend. The wrapper application and the micro-frontend can be executing in a browser window 508.

In block 604, the first message handler 516 generates a request message 116 based on the request 114. The request message 116 can include a unique identifier 520 assigned to the request 114. In some examples, the request message 116 may also include a function name and one or more arguments for the function, where the function is to be executed by the requestee 512 to obtain the data 522.

In block 606, the first message handler 516 transmits the request message 116 via a communication channel 118 to a second message handler 518 associated with the requestee 512. The communication channel 118 can be any suitable communication means that is internal to or external to the browser window 508.

In block 608, the first message handler 516 receives a response message 142 from the second message handler 519 via the communication channel 118. The response message 142 can include the data 522 and the unique identifier 520.

In some examples, the first message handler 516 can monitor the communication channel to detect incoming messages, such as the response message 142. Upon detecting an incoming message, the first message handler 516 can execute logic to determine whether the first message handler 516 should process the incoming message or ignore the incoming message. This may involve comparing a message handler identifier in the incoming message to another message handler identifier that is assigned to the first message handler 516. If the two message handler identifiers match, then the incoming message is intended for the first message handler 516 and the first message handler 516 can process the message.

In block 610, the first message handler 516 provides the data 522 to the requestor 510 in a response 126 to the request 114, based on the unique identifier 520 in the response message 142. The first message handler 516 can use the unique identifiers in response messages to help ensure that the correct data is returned for each request from the requestor 510.

Figure 7:
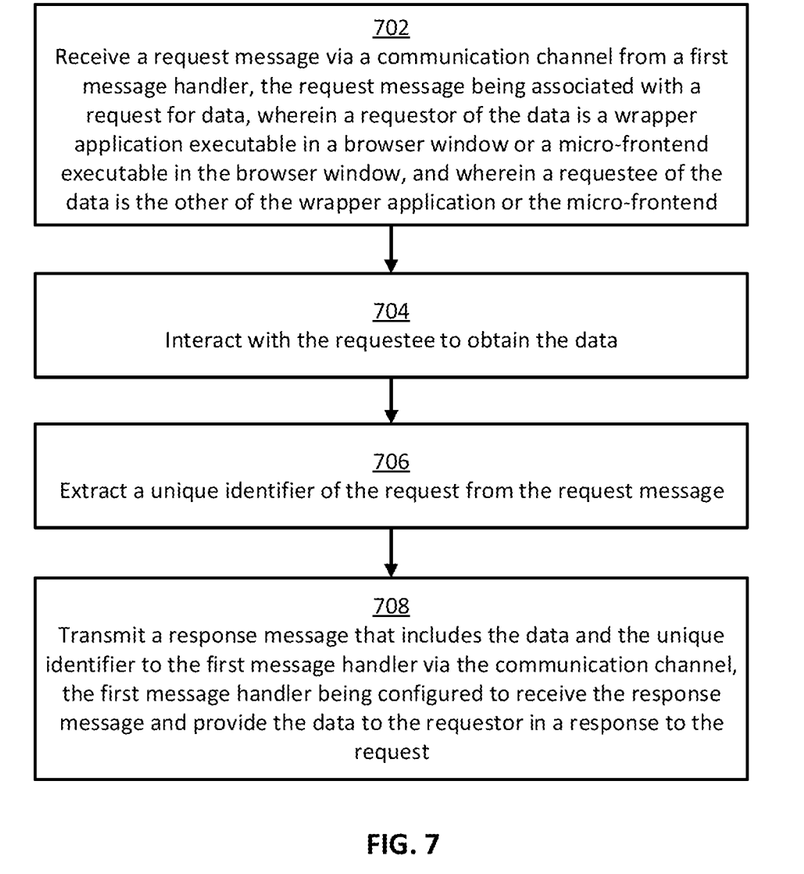
FIG. 7 shows a flow chart of an example of a process implemented by a second message handler according to some aspects of the present disclosure.

FIG. 7 shows a flow chart of an example of a process implemented by a second message handler according to some aspects of the present disclosure. But other examples can include more steps, fewer steps, different steps, or a different order of the steps than is shown in FIG. 7. The steps of FIG. 7 are discussed below with reference to the components discussed above in relation to FIGS. 1 and 5.

In block 702, the second message handler 518 receives a request message 116 via a communication channel 118 from a first message handler 516. The request message 116 can be associated with a request 114 for data 522. A requestor 510 of the data 522 can be a wrapper application executable in a browser window 508 or a micro-frontend executable in the browser window 508. A requestee 512 of the data 522 can be the other of the wrapper application or the micro-frontend.

In block 704, the second message handler 518 interacts with the requestee 512 to obtain the data 522 in response the request message 116. For example, the second message handler 518 may request the data 522 from the requestee 512.

In block 706, the second message handler 518 extracts a unique identifier 520 from the request message 116.

In block 708, the second message handler 518 transmit a response message 142 that includes the data 522 and the unique identifier 520 to the first message handler 516 via the communication channel 118. The first message handler 516 can be configured to receive the response message 142 and provide the data 522 to the requestor 510 in a response 126 to the request 114.

In some aspects, a communication system for micro-frontends of a web application can be implemented according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code for a first message handler configured to: receive a request for data from a requestor, wherein the requestor is a wrapper application or a micro-frontend and a requestee is the other of the wrapper application or the micro-frontend, the wrapper application and the micro-frontend being executable in a browser window; generate a request message based on the request, the request message including a unique identifier assigned to the request; transmit the request message via a communication channel to a second message handler associated with the requestee; receive a response message from the second message handler via the communication channel, wherein the response message includes the data and the unique identifier; and based on the unique identifier in the response message, provide the data to the requestor in a response to the request.

Example #2: The non-transitory computer-readable medium of Example #1, wherein the first message handler is further configured to: extract a message handler identifier (MHI) from the response message; determine whether the MHI corresponds to the first message handler; and in response to determining that the MHI corresponds to the first message handler, provide the data in the response message to the requestor.

Example #3: The non-transitory computer-readable medium of Example #2, wherein the MHI is a first MHI, the response message is a first response message, and the first message handler is further configured to: receive a second response message via the communication channel; extract a second MHI from the second response message; and in response to determining that the second MHI does not correspond to the first message handler, ignore the second response message.

Example #4: The non-transitory computer-readable medium of any of Examples #1-3, wherein the first message handler is configured to: receive the request from the requestor; generate the unique identifier for the request; generate and return a browser object to the requestor based on the request; generate a mapping that includes a correlation between the browser object and the unique identifier; and subsequent to receiving the response message via the communication channel: extract the unique identifier from the response message; determine that the browser object corresponds to the response message based on the correlation in the mapping; and in response to determining that the browser object corresponds to the response message, resolve the browser object with the data to provide the requestor with the data.

Example #5: The non-transitory computer-readable medium of any of Examples #1-4, wherein the requestor is the wrapper application, the first message handler is associated with the wrapper application, the requestee is the micro-frontend, and the second message handler is associated with the micro-frontend.

Example #6: The non-transitory computer-readable medium of any of Examples #1-5, wherein the requestor is the micro-frontend, the first message handler is associated with the micro-frontend, the requestee is the wrapper application, and the second message handler is associated with the wrapper application.

Example #7: The non-transitory computer-readable medium of any of Examples #1-6, wherein the communication channel is a messaging bus.

Example #8: The non-transitory computer-readable medium of Example any of Examples #1-7, wherein the request is in a first format and the request message is in a second format that is different from the first format.

Example #9: A system comprising: a processor; and a memory that is communicatively coupled to the processor, the memory including: wrapper application code for a wrapper application that is executable in a browser window; micro-frontend code for a micro-frontend that is executable in the browser window such that the micro-frontend is a child of the wrapper application in a document object model (DOM) hierarchy; and message handler code for a first message handler that is executable in the browser window, the first message handler being configured to: receive a request for data from a requestor, wherein the requestor is the wrapper application or the micro-frontend and a requestee is the other of the wrapper application or the micro-frontend; generate a request message based on the request, the request message including a unique identifier assigned to the request; transmit the request message via a communication channel to a second message handler associated with the requestee; receive a response message from the second message handler via the communication channel, wherein the response message includes the data and the unique identifier; and based on the unique identifier in the response message, provide the data to the requestor in a response to the request.

Example #10: The system of Example #9, wherein the first message handler is further configured to: extract a message handler identifier (MHI) from the response message; determine whether the MHI corresponds to the first message handler; and in response to determining that the MHI corresponds to the first message handler, provide the data in the response message to the requestor.

Example #11: The system of any of Examples #9-10, wherein the wrapper application is configured to communicate with a plurality of micro-frontends in the browser window via a plurality of message handlers, wherein the plurality of micro-frontends include a first micro-frontend that is executable in a first context of the browser window and a second micro-frontend that is executable in a second context of the browser window, the second context being distinct from the first context.

Example #12: The system of Example #11, wherein the first context is an iFrame and the second context is external to the iFrame.

Example #13: The system of any of Examples #9-12, wherein the first message handler is configured to: receive the request from the requestor; generate the unique identifier for the request; generate and return a promise object to the requestor based on the request; generate a mapping that includes a correlation between the promise object and the unique identifier; and subsequent to receiving the response message via the communication channel: extract the unique identifier from the response message; determine that the promise object corresponds to the response message based on the correlation in the mapping; and in response to determining that the promise object corresponds to the response message, resolve the promise object with the data to provide the requestor with the data.

Example #14: The system of any of Examples #9-13, wherein the request message includes a function to be executed by the micro-frontend, and wherein the micro-frontend is configured to: obtain the data by executing the function; and return the data to the second message handler for communication in the response message to the first message handler.

Example #15: A method comprising: receiving, by a first message handler executing in a browser window of a computing device, a request for data from a requestor, wherein the requestor is a wrapper application or a micro-frontend and a requestee is the other of the wrapper application or the micro-frontend, and wherein the wrapper application and the micro-frontend are executing in the browser window; generating, by the first message handler, a request message based on the request, the request message including a unique identifier assigned to the request; transmitting, by the first message handler, the request message via a communication channel to a second message handler associated with the requestee, wherein the second message handler is executing in the browser window; receiving, by the first message handler, a response message from the second message handler via the communication channel, wherein the response message includes the data and the unique identifier; and based on the unique identifier in the response message, providing, by the first message handler, the data to the requestor in a response to the request.

Example #16: The method of Example #15, further comprising: extracting, by the first message handler, a message handler identifier (MHI) from the response message; determining, by the first message handler, whether the MHI corresponds to the first message handler; and in response to determining that the MHI corresponds to the first message handler, providing, by the first message handler, the data in the response message to the requestor.

Example #17: The method of any of Examples #15-16, further comprising: receiving, by the first message handler, the request from the requestor; generating, by the first message handler, the unique identifier for the request; generating and returning, by the first message handler, a browser object to the requestor based on the request; generating, by the first message handler, a mapping that includes a correlation between the browser object and the unique identifier; and subsequent to receiving the response message via the communication channel: extracting, by the first message handler, the unique identifier from the response message; determining, by the first message handler, that the browser object corresponds to the response message based on the correlation in the mapping; and in response to determining that the browser object corresponds to the response message, resolving, by the first message handler, the browser object with the data to provide the requestor with the data.

Example #18: The method of any of Examples #15-17, wherein the request message includes a function name and arguments for a function to be executed by the micro-frontend, and further comprising: obtaining, by the micro-frontend executing in the browser window, the data by executing the function based on the function name and arguments specified in the request message; and returning, by the micro-frontend, the data to the second message handler for communication in the response message to the first message handler.

Example #19: The method of any of Examples #15-18, further comprising: receiving, by the second message handler executing in the browser window, the data from the micro-frontend; and generating, by the second message handler, the response message based on the data; and transmitting, by the second message handler, the response message to the first message handler via the communication channel.

Example #20: The method of any of Examples #15-19, wherein the micro-frontend is a first micro-frontend executing in a first context of the browser window, and further comprising: executing a second micro-frontend in a second context of the browser window, the second context being distinct from the first context; and executing a third event handler and a fourth event handler for enabling communications between the wrapper application and the second micro-frontend, wherein the third event handler corresponds to the wrapper application and the fourth event handler corresponds to the second micro-frontend.

Example #21: A server comprising: a processor; and a non-transitory computer-readable medium comprising program code that is executable by the processor for causing the processor to: receive a webpage request from a client device; and in response to receiving the webpage request: provide wrapper application code and micro-frontend code to the client device, the wrapper application code being for a wrapper application executable in a browser window of the client device, and the micro-frontend code being for a micro-frontend executable in the browser window of the client device; and provide first message-handler code and second message-handler code to the client device, wherein the first message-handler code is for a first message handler executable in the browser window and the second message-handler code is for a second message handler executable in the browser window, the first message handler being configured to: receive a request for data from a requestor, wherein the requestor is the wrapper application or the micro-frontend and a requestee is the other of the wrapper application or the micro-frontend; generate a request message based on the request, the request message including a unique identifier assigned to the request; transmit the request message via a communication channel to a second message handler associated with the requestee; receive a response message from the second message handler via the communication channel, wherein the response message includes the data and the unique identifier; and based on the unique identifier in the response message, provide the data to the requestor in a response to the request.

Example #22: The server of Example #21, wherein the first message handler is further configured to: extract a message handler identifier (MHI) from the response message; determine whether the MHI corresponds to the first message handler; and in response to determining that the MHI corresponds to the first message handler, provide the data in the response message to the requestor.

Example #23: The server of Example #22, wherein the MHI is a first MHI, the response message is a first response message, and the first message handler is further configured to: receive a second response message via the communication channel; extract a second MHI from the second response message; and in response to determining that the second MHI does not correspond to the first message handler, ignore the second response message.

Example #24: The server of any of Examples #21-23, wherein the first message handler is configured to: receive the request from the requestor; generate the unique identifier for the request; generate and return a browser object to the requestor based on the request; generate a mapping that includes a correlation between the browser object and the unique identifier; and subsequent to receiving the response message via the communication channel: extract the unique identifier from the response message; determine that the browser object corresponds to the response message based on the correlation in the mapping; and in response to determining that the browser object corresponds to the response message, resolve the browser object with the data to provide the requestor with the data.

Example #25: The server of any of Examples #21-24, wherein the requestor is the wrapper application, the first message handler is associated with the wrapper application, the requestee is the micro-frontend, and the second message handler is associated with the micro-frontend.

Example #26: A method comprising: receiving, by a processor of a server, a webpage request from a client device; and in response to receiving the webpage request: providing, by the processor, wrapper application code and micro-frontend code to the client device, the wrapper application code being for a wrapper application executable in a browser window of the client device, and the micro-frontend code being for a micro-frontend executable in the browser window of the client device; and providing, by the processor, first message-handler code and second message-handler code to the client device, wherein the first message-handler code is for a first message handler executable in the browser window and the second message-handler code is for a second message handler executable in the browser window, the first message handler being configured to: receive a request for data from a requestor to a requestee, wherein the requestor is the wrapper application or the micro-frontend and the requestee is the other of the wrapper application or the micro-frontend; generate a request message based on the request, the request message including a unique identifier assigned to the request; transmit the request message via a communication channel to a second message handler associated with the requestee; receive a response message from the second message handler via the communication channel, wherein the response message includes the data and the unique identifier; and based on the unique identifier in the response message, provide the data to the requestor in a response to the request.

Example #27: The method of Example #26, wherein the first message handler is further configured to: extract a message handler identifier (MHI) from the response message; determine whether the MHI corresponds to the first message handler; and in response to determining that the MHI corresponds to the first message handler, provide the data in the response message to the requestor.

Example #28: The method of Example #27, wherein the MHI is a first MHI, the response message is a first response message, and the first message handler is further configured to: receive a second response message via the communication channel; extract a second MHI from the second response message; and in response to determining that the second MHI does not correspond to the first message handler, ignore the second response message.

Example #29: The method of any of Examples #26-28, wherein the first message handler is configured to: receive the request from the requestor; generate the unique identifier for the request; generate and return a browser object to the requestor based on the request; generate a mapping that includes a correlation between the browser object and the unique identifier; and subsequent to receiving the response message via the communication channel: extract the unique identifier from the response message; determine that the browser object corresponds to the response message based on the correlation in the mapping; and in response to determining that the browser object corresponds to the response message, resolve the browser object with the data to provide the requestor with the data.

Example #30: The method of any of Examples #26-29, wherein the requestor is the wrapper application, the first message handler is associated with the wrapper application, the requestee is the micro-frontend, and the second message handler is associated with the micro-frontend.

Example #31: A non-transitory computer-readable medium comprising program code for a first message handler configured to perform operations including: receiving a request message via a communication channel from a second message handler, the request message being associated with a request for data, wherein a requestor of the data is a wrapper application executable in a browser window or a micro-frontend executable in the browser window, and wherein a requestee of the data is the other of the wrapper application or the micro-frontend; and in response to receiving the request message: interacting with the requestee to obtain the data; extracting a unique identifier of the request from the request message; and transmitting a response message that includes the data and the unique identifier to the second message handler via the communication channel, the second message handler being configured to receive the response message and provide the data to the requestor in a response to the request.

Example #32: The non-transitory computer-readable medium of Example #31, wherein the request message includes a function name for a function to be executed by the requestee, and wherein interacting with the requestee involves indicating the function name to the requestee, the requestee being configured to receive the function name and responsively obtain the data by executing the function.

Example #33: The non-transitory computer-readable medium of any of Examples #31-32, wherein the first message handler is further configured to: determine a message handler identifier (MHI) associated with the second message handler; and incorporate the MHI into the response message for use by the second message handler in determining which messages received via the communication channel are intended for the second message handler.

Example #34: A system comprising: means for executing a wrapper application in a browser window and a micro-frontend in the browser window, the micro-frontend being a child of the wrapper application in a document object model (DOM) hierarchy; and means for executing a first message handler in the browser window and a second message handler in the browser window, wherein the first message handler is associated with a requestor of data and the second message handler is associated with a requestee of the data, wherein the requestor is the wrapper application or the micro-frontend and wherein the requestee is the other of the wrapper application or the micro-frontend, the first message handler being configured to: receive a request for the data from the requestor; generate a request message based on the request, the request message including a unique identifier assigned to the request; transmit the request message via a communication channel to the second message handler associated with the requestee; receive a response message from the second message handler via the communication channel, wherein the response message includes the data and the unique identifier; and based on the unique identifier in the response message, provide the data to the requestor in a response to the request.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A server comprising:
   a processor; and
   a memory including program code that is executable by the processor for causing the processor to:
   receive a webpage request from a client device; and
   in response to receiving the webpage request:
      provide wrapper application code and micro-frontend code to the client device, the wrapper application code being for a wrapper application executable in a browser window of the client device, and the micro-frontend code being for a micro-frontend executable in the browser window of the client device; and
      provide first message-handler code and second message-handler code to the client device, wherein the first message-handler code is for a first message handler executable in the browser window and the second message-handler code is for a second message handler executable in the browser window, the first message handler being associated with the wrapper application and configured to:
         receive a request for data from the wrapper application, wherein the data is to be provided by a micro-frontend;
         generate a request message based on the request, the request message including a unique identifier of the request;
         transmit the request message via a communication channel to the second message handler associated with the micro-frontend;
         receive a response message from the second message handler via the communication channel, wherein the response message includes the data and the unique identifier, the second message handler being configured to generate the response message based on the data from the micro-frontend; and
         based on the unique identifier in the response message, provide the data to the wrapper application in a response to the request.

2. The server of claim 1, wherein the first message handler is further configured to:
   extract a message handler identifier (MHI) from the response message;
   determine whether the MHI corresponds to the first message handler; and
   in response to determining that the MHI corresponds to the first message handler, provide the data in the response message to the wrapper application.

3. The server of claim 2, wherein the MHI is a first MHI, the response message is a first response message, and the first message handler is further configured to:
   receive a second response message via the communication channel;
   extract a second MHI from the second response message; and
   in response to determining that the second MHI does not correspond to the first message handler, ignore the second response message.

4. The server of claim 1, wherein the first message handler is configured to:
   receive the request from the wrapper application;
   generate the unique identifier for the request;
   generate and return a browser object to the wrapper application based on the request;
   generate a mapping that includes a correlation between the browser object and the unique identifier; and
   subsequent to receiving the response message via the communication channel:
      extract the unique identifier from the response message;
      determine that the browser object corresponds to the response message based on the correlation in the mapping; and
      in response to determining that the browser object corresponds to the response message, resolve the browser object with the data to provide the wrapper application with the data.

5. The server of claim 1, wherein the communication channel is a messaging bus.

6. The server of claim 1, wherein the request is in a first format, and wherein the request message is in a second format that is different from the first format.

7. The server of claim 1, wherein the first message handler is separate from the wrapper application.

8. The server of claim 1, wherein the second message handler is separate from the micro-frontend.

9. A method comprising:
   receiving, by a server system, a webpage request from a client device; and
   in response to receiving the webpage request:
      providing, by the server system, wrapper application code and micro-frontend code to the client device, the wrapper application code being for a wrapper application executable in a browser window of the client device, and the micro-frontend code being for a micro-frontend executable in the browser window of the client device; and
      providing, by the server system, first message-handler code and second message-handler code to the client device, wherein the first message-handler code is for a first message handler executable in the browser window and the second message-handler code is for a second message handler executable in the browser window, the first message handler being associated with the wrapper application and configured to:
         receive a request for data from the wrapper application, wherein the data is to be provided by a micro-frontend;
         generate a request message based on the request, the request message including a unique identifier of the request;

transmit the request message via a communication channel to the second message handler associated with the micro-frontend;

receive a response message from the second message handler via the communication channel, wherein the response message includes the data and the unique identifier, the second message handler being configured to generate the response message based on the data from the micro-frontend; and based on the unique identifier in the response message, provide the data to the wrapper application in a response to the request.

10. The method of claim 9, wherein the first message handler is further configured to:

extract a message handler identifier (MHI) from the response message;

determine whether the MHI corresponds to the first message handler; and in response to determining that the MHI corresponds to the first message handler, provide the data in the response message to the wrapper application.

11. The method of claim 10, wherein the MHI is a first MHI, the response message is a first response message, and the first message handler is further configured to:

receive a second response message via the communication channel;

extract a second MHI from the second response message; and in response to determining that the second MHI does not correspond to the first message handler, ignore the second response message.

12. The method of claim 9, wherein the wrapper application is configured to communicate with a plurality of micro-frontends in the browser window via a plurality of message handlers, wherein the plurality of micro-frontends including a first micro-frontend that is executable in a first context of the browser window and a second micro-frontend that is executable in a second context of the browser window, the second context being distinct from the first context.

13. The method of claim 12, wherein the first context is an iFrame and the second context is external to the iFrame.

14. The method of claim 9, wherein the first message handler is configured to:

receive the request from the wrapper application;

generate the unique identifier for the request;

generate and return a promise object to the wrapper application based on the request;

generate a mapping that includes a correlation between the promise object and the unique identifier; and subsequent to receiving the response message via the communication channel:

extract the unique identifier from the response message;

determine that the promise object corresponds to the response message based on the correlation in the mapping; and in response to determining that the promise object corresponds to the response message, resolve the promise object with the data to provide the wrapper application with the data.

15. The method of claim 9, wherein the request specifies a function to be executed by the micro-frontend, and wherein the micro-frontend is configured to:

obtain the data by executing the function; and return the data to the second message handler for communication to the first message handler.

16. A non-transitory computer-readable medium comprising program code that is executable by one or more processors for causing the one or more processors to:

receive a webpage request from a client device; and in response to receiving the webpage request:

provide wrapper application code and micro-frontend code to the client device, the wrapper application code being for a wrapper application executable in a browser window of the client device, and the micro-frontend code being for a micro-frontend executable in the browser window of the client device; and provide first message-handler code and second message-handler code to the client device, wherein the first message-handler code is for a first message handler executable in the browser window and the second message-handler code is for a second message handler executable in the browser window, the first message handler being associated with the wrapper application and configured to:

receive a request for data from the wrapper application, wherein the data is to be provided by a micro-frontend;

generate a request message based on the request, the request message including a unique identifier of the request;

transmit the request message via a communication channel to the second message handler associated with the micro-frontend;

receive a response message from the second message handler via the communication channel, wherein the response message includes the data and the unique identifier, the second message handler being configured to generate the response message based on the data from the micro-frontend; and based on the unique identifier in the response message, provide the data to the wrapper application in a response to the request.

17. The non-transitory computer-readable medium of claim 16, wherein the first message handler is configured to:

receive the request from the wrapper application;

generate the unique identifier for the request;

generate and return a promise object to the wrapper application based on the request;

generate a mapping that includes a correlation between the promise object and the unique identifier; and subsequent to receiving the response message via the communication channel:

extract the unique identifier from the response message;

determine that the promise object corresponds to the response message based on the correlation in the mapping; and in response to determining that the promise object corresponds to the response message, resolve the promise object with the data to provide the wrapper application with the data.

18. The non-transitory computer-readable medium of claim 16, wherein the request message specifies a function name and arguments for a function to be executed by the micro-frontend, and wherein the micro-frontend is configured to:

obtain the data by executing the function based on the function name and arguments specified in the request message; and return the data to the second message handler for communication to the first message handler.

19. The non-transitory computer-readable medium of claim 16, wherein the second message handler is configured to:
  receive the data from the micro-frontend; and
  generate the response message based on the data; and
  transmit the response message to the first message handler via the communication channel.

20. The non-transitory computer-readable medium of claim 16, wherein the wrapper application is configured to communicate with a plurality of micro-frontends in the browser window via a plurality of message handlers, wherein the plurality of micro-frontends including a first micro-frontend that is executable in a first context of the browser window and a second micro-frontend that is executable in a second context of the browser window, the second context being distinct from the first context.

* * * * *